US012244556B1

(12) United States Patent
Jiang et al.

(10) Patent No.: US 12,244,556 B1
(45) Date of Patent: Mar. 4, 2025

(54) CLASSIFYING DATA USING MACHINE LEARNING

(71) Applicant: Doma Technology LLC, San Francisco, CA (US)

(72) Inventors: Ying Jiang, Fremont, CA (US); Apoorv Sharma, San Mateo, CA (US); Brian Matthew Holligan, San Francisco, CA (US)

(73) Assignee: Doma Technology LLC, San Francisco, CA (US)

( * ) Notice: Subject to any disclaimer, the term of this patent is extended or adjusted under 35 U.S.C. 154(b) by 0 days.

(21) Appl. No.: 18/112,442

(22) Filed: Feb. 21, 2023

Related U.S. Application Data

(60) Provisional application No. 63/312,790, filed on Feb. 22, 2022.

(51) Int. Cl.
| | | |
|---|---|---|
| *G06F 15/16* | (2006.01) | |
| *G06F 40/205* | (2020.01) | |
| *G06F 40/30* | (2020.01) | |
| *G06N 20/00* | (2019.01) | |
| *G06V 30/19* | (2022.01) | |
| *H04L 51/063* | (2022.01) | |
| *H04L 51/08* | (2022.01) | |
| *H04L 51/48* | (2022.01) | |

(52) U.S. Cl.
CPC ............ *H04L 51/48* (2022.05); *G06F 40/205* (2020.01); *G06F 40/30* (2020.01); *G06N 20/00* (2019.01); *G06V 30/19173* (2022.01); *H04L 51/063* (2013.01); *H04L 51/08* (2013.01)

(58) Field of Classification Search
CPC ....... H04L 51/48; H04L 51/063; H04L 51/08; G06N 20/00; G06F 40/205; G06F 40/30; G06V 30/19173
USPC ........................................................ 709/206
See application file for complete search history.

(56) References Cited

U.S. PATENT DOCUMENTS

| | | | | |
|---|---|---|---|---|
| 6,925,454 B2 * | 8/2005 | Lam | ..................... | G06Q 10/063 706/45 |
| 7,149,801 B2 * | 12/2006 | Burrows | ............... | H04L 63/126 709/225 |
| 7,386,520 B2 * | 6/2008 | Hehl | .................... | G06Q 10/107 705/400 |
| 7,386,593 B2 * | 6/2008 | Arning | ................ | G06Q 10/107 709/224 |
| 8,046,832 B2 * | 10/2011 | Goodman | ............ | H04L 51/212 709/206 |

(Continued)

*Primary Examiner* — Alicia Baturay
(74) *Attorney, Agent, or Firm* — Walters IP Law; Gregory A. Walters (57) ABSTRACT

Methods, systems, and apparatus, including computer programs encoded on computer storage media, for machine learning. One of the methods includes receiving a message; parsing the message to identify individual sentences within the message; encoding each sentence into a vector that represents a semantic meaning of the sentence; applying one or more classification models to the message including: providing each vector to a machine learning model, wherein the machine learning model is trained to generate a prediction of one or more classifications for each sentence of the message; generating a predicted classification for the message as a whole; and determining a message routing based on the predicted classification.

25 Claims, 3 Drawing Sheets

(56) References Cited

U.S. PATENT DOCUMENTS

| | | | |
|---|---|---|---|
| 8,386,574 B2 * | 2/2013 | Chidlovskii | G06F 18/2433 709/206 |
| 8,832,205 B2 * | 9/2014 | Nelson | G06Q 10/109 709/205 |
| 10,505,882 B2 * | 12/2019 | Hempton | H04L 51/18 |
| 10,630,631 B1 * | 4/2020 | Yague | H04L 51/212 |
| 10,817,527 B1 * | 10/2020 | Setlur | G06F 16/248 |
| 10,885,452 B1 * | 1/2021 | Garg | G06N 7/01 |
| 10,904,185 B1 * | 1/2021 | Kawai | H04L 51/48 |
| 10,938,766 B2 * | 3/2021 | Hempton | G06F 16/275 |
| 11,132,647 B1 * | 9/2021 | Shah | H04L 51/212 |
| 11,182,130 B2 * | 11/2021 | Sutton | G06F 40/30 |
| 11,184,313 B1 * | 11/2021 | Yague | H04L 51/212 |
| 11,201,846 B2 * | 12/2021 | Hempton | H04L 51/234 |
| 11,340,963 B2 * | 5/2022 | Dotan-Cohen | G06F 40/44 |
| 11,516,172 B2 * | 11/2022 | More | G06F 40/205 |
| 11,567,788 B1 * | 1/2023 | Khemka | G06Q 10/109 |
| 11,568,482 B1 * | 1/2023 | Goel | G06N 20/20 |
| 11,615,463 B2 * | 3/2023 | Burris | G06N 3/08 706/15 |
| 11,677,709 B2 * | 6/2023 | Hempton | H04L 51/212 709/206 |
| 11,689,563 B1 * | 6/2023 | Spitler | H04L 63/145 726/22 |
| 11,704,371 B1 * | 7/2023 | Chan | G06F 16/9035 707/736 |
| 11,710,000 B1 * | 7/2023 | Cuan | G06F 16/345 709/206 |
| 11,755,289 B1 * | 9/2023 | Almasan | G06N 20/00 717/104 |
| 11,775,138 B2 * | 10/2023 | Saka | H04L 51/00 715/752 |
| 11,855,860 B1 * | 12/2023 | Kumar | G06N 3/0455 |
| 2014/0223284 A1 * | 8/2014 | Rankin, Jr. | G06F 40/169 715/234 |
| 2017/0161372 A1 * | 6/2017 | Fernández | G06F 40/211 |
| 2020/0304448 A1 * | 9/2020 | Zhang | G06Q 10/10 |
| 2023/0004568 A1 * | 1/2023 | Wu | G06N 5/041 |
| 2023/0004727 A1 * | 1/2023 | Oberoi | G06Q 10/06311 |
| 2023/0101224 A1 * | 3/2023 | Singh | G06N 20/00 707/770 |
| 2023/0128422 A1 * | 4/2023 | Li | G10L 15/24 345/156 |
| 2023/0135179 A1 * | 5/2023 | Mielke | G06N 5/022 704/232 |
| 2023/0177256 A1 * | 6/2023 | Danducci, II | G06F 40/274 715/254 |
| 2023/0236555 A1 * | 7/2023 | Liu | H04L 67/125 700/83 |
| 2023/0245654 A1 * | 8/2023 | Shrivastava | G10L 15/1822 704/243 |
| 2023/0283878 A1 * | 9/2023 | Huang | H04N 21/8549 348/207.11 |
| 2023/0328034 A1 * | 10/2023 | Behera | H04L 63/1483 726/22 |
| 2023/0353652 A1 * | 11/2023 | Bi | H04L 67/55 |
| 2023/0370410 A1 * | 11/2023 | Griesbach | H04L 51/56 |
| 2023/0385685 A1 * | 11/2023 | Allouche | G06N 20/00 |

* cited by examiner

CLASSIFYING DATA USING MACHINE LEARNING

CROSS-REFERENCE TO RELATED APPLICATIONS

This application claims the benefit under 35 U.S.C. § 119(e) of the filing date of U.S. Patent Application No. 63/312,790, for Classifying Data Using Machine Learning, which was filed on Feb. 22, 2022, and which is incorporated here by reference.

BACKGROUND

This specification relates to machine learning. Conventional machine learning models can be trained to generate a particular type of output from a given input. Typically, a machine learning model is trained using a collection of labeled training data. The machine learning model can be trained such that the model correctly labels the input training data. New data can then be input into the machine learning model to determine a corresponding label for the new data.

SUMMARY

Machine learning models can be used to identify data having a particular type. This specification describes a system that uses a machine learning model to process input documents to generate a prediction of one or more classifications. In particular, the machine learning model can be trained based on a collection of training examples such as messages, e.g., e-mails. For a given input message, each sentence in the input message can be extracted and converted into a vector representation. For each sentence, the corresponding vector representation is classified as actionable or unactionable. Based on the classification of each sentence, the message is classified into one or more categories. Based on the classification of the message, in some implementations, the message is associated with a particular task or processing action and routed to a recipient based on a task assignment.

The subject matter described in this specification can be implemented in particular embodiments so as to realize one or more of the following advantages. Email messages and documents attached to the email messages can be automatically processed to determine which ones are actionable or unactionable. Based on the classification of the email message and/or attachment, actionable emails can be appropriately routed. As a result, the system can prevent unactionable emails from being viewed by human operators, thereby reducing the time spent reviewing and responding to such messages. In some instances, once classified as actionable, the system can further process the message to determine a task corresponding to the message content. Based on the task, the message can then be routed to the appropriate operator or system for further processing, e.g., by one or more additional models. In some implementations, only messages classified as actionable are further processed by one or more models, which improves the model efficiency by not trying to act on messages unrelated to the model classifiers.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

This specification describes techniques for training and applying a machine learning model to message data. The machine learning model can be trained to predict the likelihood that a message has a particular classification. The machine learning model can be trained using a collection of labeled training data. In some implementations, the classification is performed on e-mail messages or other electronic messages and documents. Features input to the model can include features derived from a training set of labeled messages. The output of the machine learning model can include a single classification result indicating that a subset of the message content or data (e.g., a sentence) or the message as a whole either contains actionable content or does not. Based on the classification, the message can be appropriately routed.

In some implementations, a second, rule-based classifier, is also applied to the message content. These rules can define a message as actionable or unactionable regardless of the machine learning classifier result. Alternatively, in some implementations, the rule-based classifier is applied to the message first. If the rules are satisfied such that the message is identified as actionable, the machine learning classifier can be bypassed for the message.

In some implementations, one or more text processing steps can be performed on an incoming message both to clean the message content, extract sentences from the cleaned message content, and generate numerical representations for each sentence. These processing operations are described in greater detail below.

In some implementations, the described machine learning classifiers are part of a title production system for real property transactions. A title production system is used by title companies to manage workflows and interchange of work with various third parties involved in the transaction. During a typical real property transaction, there are a number of actions that need to take place, for example, to generate a title insurance policy for the real property transaction. To facilitate these actions information is often exchanged back and forth between the title company and other parties, e.g., lenders. Some of these messages include content relevant to a workflow while other messages are simple acknowledgements or other content that is not needed for executing a workflow. Implementing processing routines that are operable to filter out these unactionable messages improves efficiency in processing the actionable messages. Additionally, actionable messages can be further processed to determine the tasks or workflows they relate to, which can be used to identify a particular recipient (human or automatic processing system) regardless of any "to" address of the message itself.

Message Processing System

Figure 1:
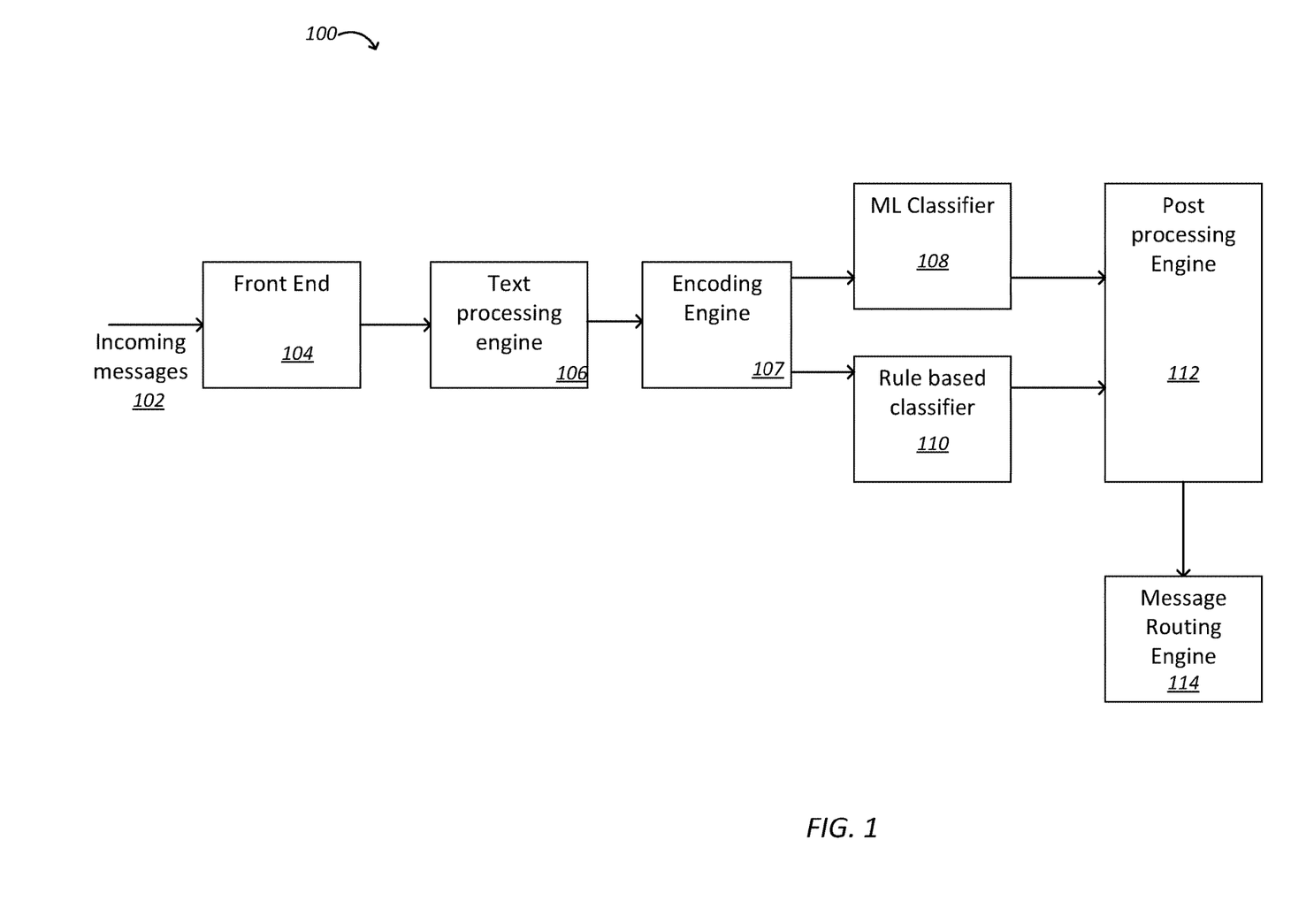
FIG. 1 is a flow diagram disclosing an example message processing system.

FIG. 1 is an example message processing system 100. The system 100 can be (or be a subsystem of) a title production system. In particular, in some instances, the message processing system 100 is a system that analyzes input messages 102 to generate message classifications and corresponding routing outputs.

The message processing system 100 includes a front-end processor 104, a text processing engine 106, an encoding engine 107, a machine learning classifier 108, a rule-based classifier 110, a post processing engine 112, and a message routing engine 114.

The front-end processor 104 can be, for example, a mail server that receives incoming email traffic from external networks outside the system. In some implementations, the front-end processor 104 is a Simple Mail Transfer Protocol (SMTP) server that is configured to send and receive emails to and from users of the system, e.g., an enterprise. Once received, messages are typically routed to individual mailboxes. In some implementations, instead of immediately routing messages, they are processed by the messaging processing system 100. In some alternative implementations, one or more general mailboxes can be established and the message processing system can pull messages from these general mailboxes.

The text processing engine 106 can perform a number of text processing operations on a given message. For example, the text processing can include identifying textual content within the body of the message, and determining a relevant portion of the message to further process.

The text processing engine 106 can also parse the message to identify individual sentences within the message. For example, the system can use natural language processing to identify indicators of sentences, for example, the start of a paragraph, the use of capitalization, and particular punctuation. Thus, for example, a period followed by one or more spaces and a capital letter can indicate the beginning of a sentence that ends with another period. Various rules can be employed to perform sentence tokenization from the text content of the message. Additionally, these rules can employ dictionaries to help correctly identify sentence tokens, for example, of common abbreviations that end in a period so that it is not automatically seen as an end of a sentence.

The encoding engine 107 converts each sentence into a numerical representation. In particular, the sentence is converted into one or more embeddings comprising a number of numbers which, when taken as a whole, represent a semantic meaning for the sentence. Different techniques can be used to convert each sentence into a corresponding vector representation, for example, using a Doc2VEc or Bidirectional Encoder Representations from Transformers ("BERT") technique.

Doc2vec is an unsupervised learning algorithm used to train a model to produce vector representations of a sentence, paragraph, or whole document. For example, the Doc2vec algorithm can be employed using a neural network model that learns sentence associations from a collection of text. Once trained, the neural network model can generate a vector representation for each token (i.e., sentence) as a string of numbers having a specified number of elements, e.g., 300 numbers. The values of the vectors are chosen by the neural network model based on the training to indicate a semantic meaning of the token such that, for example, semantic similarity can be determined between different vectors.

BERT is trained on unlabeled text from a particular corpus. BERT uses an attention model to learn embeddings for sentences and includes two pre-training steps 1) Masked Language Modelling (MLM) and 2) Next Sentence Prediction (NSP). In BERT training, text is represented using three embeddings: Token Embeddings, Segment Embeddings, and Position Embeddings. Thus, each sentence of the message can be represented by three embeddings.

The machine learning classifier 108 receives the input sentence embeddings and generates a predicted classification for each sentence. In some implementations, the machine learning classifier further generates a predicted classification for the message as a whole based on the sentence classifications. The machine learning classifier 108 can be a statistical machine learning model trained on a collection of labeled data. For example, a collection of labeled email messages, and in particular messages associated with the domain of a title processing system, can be used to train the model. The labels can identify whether each sentence of a training message is actionable or unactionable. An actionable message can be one that relates to a process or task of the title processing system. In some implementations, the labels can be more specific to identify the type of task the sentence is associated with, where particular labeled tasks are mapped to an overall actionable label. An example architecture for training a statistical machine learning model is described below with respect to FIG. 2.

The rule-based classifier 110 can include a set of rules that are applied to the email message that can be used to bypass or override the machine learning classifier 108. For example, the rule-based classifier 110 can use a set of rules to determine that a message is actionable. This can override a determination that a message is unactionable by the machine learning classifier 108. In some alternative implementations, the rule-based classifier is applied prior to the machine learning classifier 108. If the output of the rule-based classifier 110 is that the message is actionable, the machine learning classifier 108 can be bypassed. In yet other implementations, the rule-based classifier 110 is applied before the encoding engine 107. This can allow for greater efficiency in bypassing the creation of sentence embeddings when the rule-based classifier determines that the message is actionable.

The post processing engine 112 can perform additional processing depending on the results of the classifier(s). For example, a message classified as actionable can be further processed to associate the message with a particular task. This can be based on one or more models configured to interpret the text content of the message to determine what it relates to, for example, a particular client, document type, or transaction.

The message routing engine 114 can determine where the message should be sent. For example, unactionable emails may be sent to an unattended mailbox or simply logged. Actionable emails can be routed to a particular recipient. This recipient can be the addressee of the message if there was a specific addressee. This recipient can also be one determined based on an associated task determined by the post processing engine 112. That is, based on the determined task, the message routing engine 114 can determine an appropriate recipient for that type of task, which may be a human operator or an automated processing system configured to operate on the task.

Training a Machine Learning Model

Figure 2:
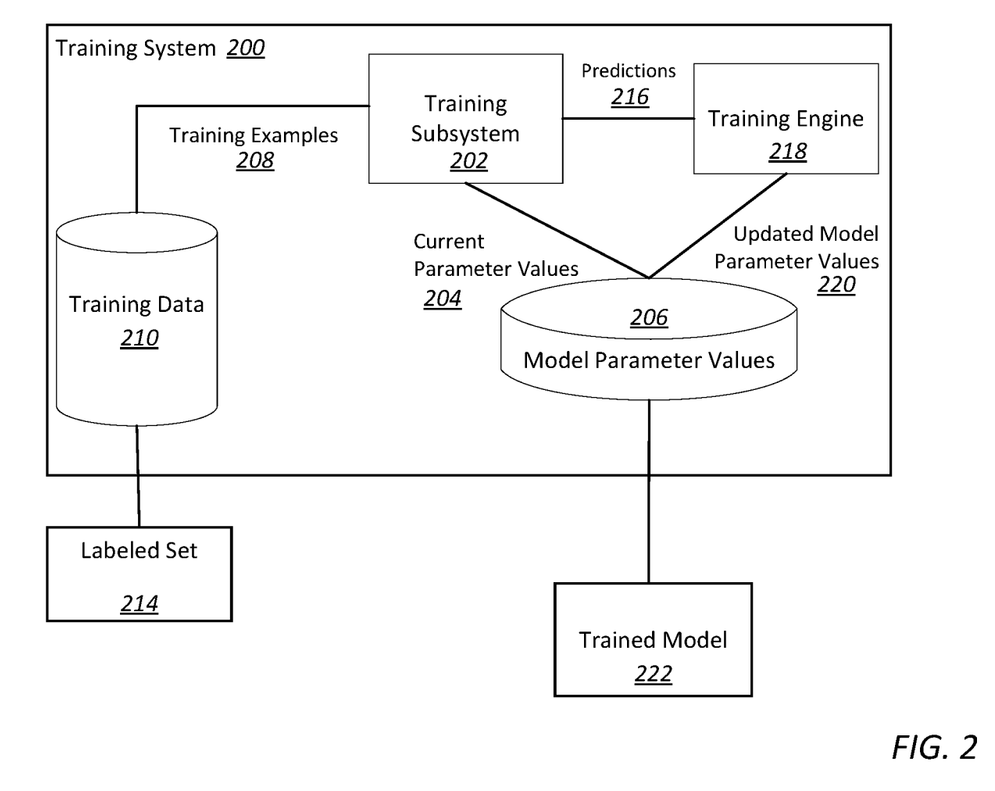
FIG. 2 is a diagram of an example training system for a machine learning model.

FIG. 2 is an example training system 200 for a machine learning model. The training system 200 includes a training subsystem 202 that can implement the operations of a machine learning model designed to make predictions, for example, of a classification of message content from a set of possible classifications. The training subsystem 202 includes a plurality of computing devices having software or hardware modules that implement the respective operations of the machine learning model being trained.

The training subsystem 202 can compute the operations of the machine learning model using current parameter values 204 stored in a collection of model parameter values 206. Although illustrated as being logically separated, the model parameter values 206 and the software or hardware modules performing the operations may actually be located on the same computing device or stored on the same memory device.

The training subsystem 202 can receive training examples 208 as input from training data 210. Each training example 208 can be a message, e.g., an email message to be classified. The training subsystem 202 can extract features from the training example 208 and use those features, along with other features associated with the training example, to compute the operations of the machine learning model using the current parameter values. Specifically, each training example can correspond to a sentence from an email message that has been labeled and encoded in a numerical representation of one or more embedding.

The training data 210 includes a collection of messages, each having one or more labeled sentences. The messages can have various content and can be pulled, for example, from a collection of email messages associated with various aspects of a real estate transaction. Each of the sentences can be labeled with a type corresponding to a known classification or can simply be labeled as actionable or unactionable. The additional type data, if included, can be used later for task association. In some implementations, the training data 210 can be composed of a human-labeled set of messages 214.

The training subsystem 202 can generate, for each training example 208, a prediction 216 of the classification of each sentence. A training engine 218 analyzes the classification predictions 216 and compares the predictions to the labels in the training examples 208. The training engine 218 can then generate updated model parameter values 220 by using an appropriate updating technique. The training engine 218 can then update the collection of model parameter values 206 using the updated model parameter values 220.

After training is complete, the training system 200 can use the final set of model parameter values 206 to form a trained model 222. The trained model 222 can be used to make predictions classifying messages based on incoming sentence embeddings.

In some implementations, the training data is based on a set of messages associated with a real estate transaction. The system is trained so that, for a given set of input features derived from message sentences, the machine learning model can generate predictions of classifications for each sentence, which in turn is used to classify the entire message as actionable or unactionable.

Message Classifying

Figure 3:
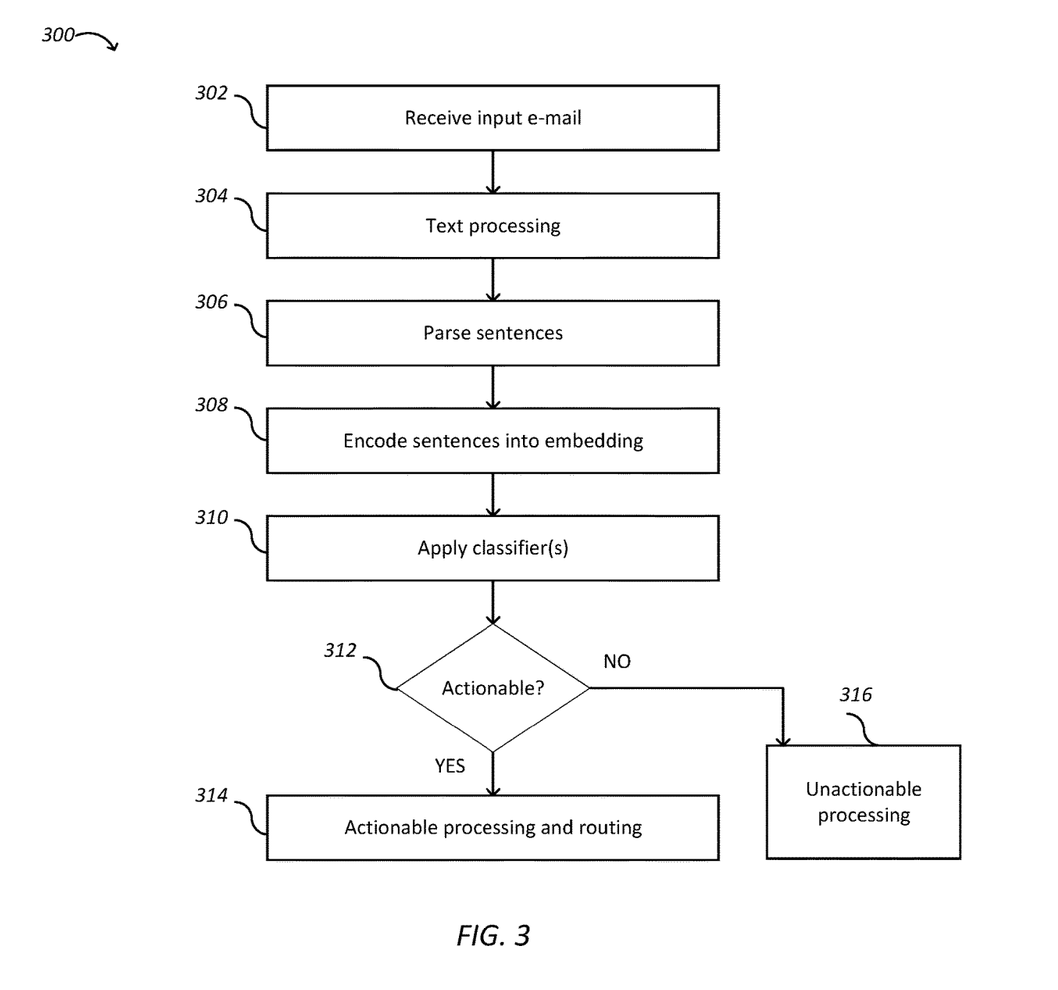
FIG. 3 is a flow diagram of an example method for classifying documents.

FIG. 3 is a flow diagram 300 of an example method for classifying documents. For convenience, the process 300 will be described as being performed by a system of one or more computers, located in one or more locations, and programmed appropriately to implement machine learning models in accordance with this specification. For example, the message processing system 100 of FIG. 1, appropriately programmed, can perform at least part of the process 300.

The system receives a message input (step 302). The message can be, for example, an e-mail received by the system from an external network. In some implementations, the message is addressed to a particular individual. In some other implementations, the message is addressed to a particular general alias address.

The system processes the text of the message (step 304). The processing can be initial processing to clean up the content of the message to identify the relevant portion of the message. In some implementations, one or more operations of this step are optional.

The processing of the text can include extracting a text portion from a message composed of raw HTML content. For example, an HTML based message can include header, tags, and other code content that is separate from the text content created by the sender. This extra material can be removed from the raw message content. For example, the system can have a list of tags used for various encoding schemes. The system can search for these tags in the raw content and remove them.

The processing of the text can also include determining whether the message is part of a chain of messages. For example, when parties reply to messages back and forth the earlier messages of the chain are typically included in the body of the message and below the current message. However, only the latest content may be relevant to the system. Typically, the most recent or current content within the message is that content appearing at the top of the message, followed by header information identifying the next message of the chain. Thus, the system can identify that the message is part of a chain and determine which part to extract based on embedded header information in the message body.

The processing of the text can determine the part of a message that was added by third-party algorithms, such as a piece of text inserted at the beginning of the message to caution against fraudulent emails or caution against emails originating outside senders (e.g., outside the organization). Removal of irrelevant prefix language surfaces the actual and primary message contents for subsequent processing by the machine learning model. Similarly, signature blocks can be identified at the end of the primary message content and omitted from the subsequent processing by the machine learning model, e.g., by identifying particular character strings or graphical elements indicative of a signature block.

The system parses sentences from the message content (step 306). In particular, the message content can be the remaining message content following the processing of text in step 304. The system parses the message content to identify the individual sentences within the message. For example, the system can use natural language processing to identify indicators of sentences, for example, the start of a paragraph, the use of capitalization, and particular punctuation, as described above with respect to the text processing engine 106. For example, the encoded text of the message can be broken up into tokens representing each individual sentence based on the identified indicators.

The system encodes each identified sentence into one or more numerical embeddings (step 308). In particular, the sentence is converted into one or more embeddings each made up of a set of numbers which, when taken as a whole, represent a semantic meaning for the sentence. For example, each sentence can be converted into a vector representation for the sentence. The vector represents the meaning of the sentence where similar sentences have vectors that have a smaller vector distance from each other than more distinct sentences. As described above, various techniques can be used to convert each sentence into a corresponding vector representation, for example, using a Doc2Vec or BERT.

The system applies one or more classifiers (step 310). In some implementations, a machine learning classifier is applied. The machine learning classifier takes one or more embeddings as input and creates a classification corresponding to each sentence of the message. The machine learning classifier leverages the embeddings of sentences surrounding each sentence (the context) to further inform the decision. This is particularly useful for very short sentences, such as a sentence that only contains a phone number. The machine learning classifier can be trained, for example, as described above with respect to FIG. 2. The classification can be a binary classification of whether the sentence is actionable or not. An "actionable" classification indicates that the sentence is associated with some process of the system. For example, the sentence can be associated with a process that is part of a real estate transaction such that the information may be used to advance the workflow of the transaction. An "unactionable" classification indicates that the sentence is not associated with a process of the system. For example, the sentence may be an acknowledgement, e.g., responsive to a received document a person may reply with a thank you message or "out of office" automated reply, that is not tied to any next action of a workflow.

In some other implementations, a rule-based classifier is applied. The rule-based classifier may be applied along with the machine learning classifier. Alternatively, in some cases the rule-based classifier is applied before applying the machine learning classifier such that the machine learning classifier is only applied if a particular rule output is not achieved.

The rule-based classifier can include a number of rules that define a message as actionable such that, if satisfied, the message can be deemed to be actionable regardless of the machine learning classifier results.

Examples of particular rules that can indicate that a message contains actionable content include:

The system can determine whether the message is actionable according to its attachments, specifically the content and type of any attachment (e.g., file type). If the message includes an attachment of a specified type, e.g., Portable Document Format ("PDF") document, then the rule classifies the message as actionable. The system may also receive a decision from an upstream computer vision model that informs the system if any attached images are relevant to the core concepts of the message, and therefore relevant to a real estate transaction.

The system can apply a knowledge base of domain terms to the text of the message. If the message includes particular n-grams that have particular domain meaning, the message is classified as actionable. For example, particular descriptions of documents or activities associated with a real estate transaction can be n-grams that trigger the rule. This protects against the possibility that the machine learning model may miss the specific domain specific meaning of those phrases when applied. In some implementations, the system includes a knowledge base that contains common domain specific terms, for example, related to real estate transactions. The knowledge base can be applied to the message text to identify the presence of the terms in the knowledge base.

The system can recognize particular structural elements of the message. If the message follows a particular template structure the message can be classified as unactionable. For example, particular types of acknowledgment messages or "out of office" replies can be identified by their structure. The process for analyzing a message for a particular template structure makes use of frequency of n-grams throughout the message to decide if the message follows a template pattern. Matching common phrases without taking into account the context of the phrase can result in mistakes or incorrect classifications of the message. An example error would be ruling a message that reads like "I apologize for being out of office the other day" corresponds to an "out-of-office" auto-reply template, simply due to the presence of the phrase "out of office". The template analysis includes extracting a vector representation of n-grams given a message template, and forming clusters of highly similar vectors given sufficient numbers of these templates. These clusters are then compared against a new message, whose n-gram vector will be assigned membership to a template cluster if it has a threshold similarity to the vectors in that cluster.

If the raw text of the message contains an embedded image, the message can be classified as actionable. For example, a sender can embed an image of a document into a message that may be associated with the transaction. When analyzing the raw encoded text of the message, e.g., an HTML message, the embedded image can be identified.

The system determines whether the message as a whole is actionable or unactionable (step 312). The output of the machine learning classifier (108) can be used to determine if the message as a whole is actionable or unactionable. In some implementations, if a single sentence of the message is classified as actionable, the entire message is classified as actionable.

Additionally, if the rule-based classifier is applied, a rule can define whether the message as a whole is actionable or unactionable based on whether one or more rules are satisfied.

In some implementations, the rule-based classification overrides any classification from the machine learning classifier. For example, if the machine learning classifier (108) classifies each sentence as unactionable, but the rule-based classifier determines the message as actionable, e.g., because it includes a PDF attachment, the classification of the rule-based classifier will control the final classification of the message.

The rule-based classifier includes multiple components. Rule-based decisions come from the content or type of attachment, the presence of n-grams capable of assigning the message into a template cluster, known natural language regular expressions. The rules are organized by priority, meaning that the application of the highest priority rule obviates the need to check the email against any other rules. If no rules are applied, the machine learning classifier will decide the actionability of the message.

In response to determining that the message as a whole is actionable, the system can perform routing of the message and optionally perform task association (step 314). In particular, the message can be routed to particular operators to act on the actionable contact. For example, certain users can be designated to review actionable messages and forward them based on the associated transaction. By only reviewing messages with actionable content, these human operators can more efficiently route messages associated with ongoing transactions.

In some implementations, the system identifies an associated task for the message to determine the appropriate routing. Identifying an associate task can include using additional classification information. For example, sentences may be labeled not only as actionable or unactionable, but also with the type of content of the sentence. This content may indicate a task or transaction the message is associated with. In some other implementations, the system applies one or more additional models to the messages classified as actionable. These models can be configured to use the content of the message to determine a particular transaction and/or task that the message is related to. For example, a message can be determined to relate to a vesting for a real estate transaction. The message may also include identifiers of entities from which the particular real estate transaction can be determined. Based on this, the relevant workflow can be determined for processing the vesting information.

The system can use the identified task or transaction to route the message. For example, it can route the message to a human operator that handles that type of task or that is assigned to the transaction. Furthermore, in some scenarios, the message can be routed to another processing system that can automatically perform some portions of the task associated with the message.

In response to determining that the message is not actionable, the system performs unactionable processing (step 316). The unactionable processing can include simply logging the message without routing the message, and in some implementations, archiving the message in the event the message must be located in the future. Alternatively, the unactionable processing can include routing the message to an unattended mailbox. In either case, the unactionable processing advantageously removes any required review of the message by a human operator, which improves efficiently associated with reviewing and acting on the operator's message queue.

An electronic document, which for brevity will simply be referred to as a document, may, but need not, correspond to a file. A document may be stored in a portion of a file that holds other documents, in a single file dedicated to the document in question, or in multiple coordinated files.

In this specification, the term "database" will be used broadly to refer to any collection of data: the data does not need to be structured in any particular way, or structured at all, and it can be stored on storage devices in one or more locations.

Similarly, in this specification the term "engine" will be used broadly to refer to a software-based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

In addition to the embodiments of the attached claims and the embodiments described above, the following numbered embodiments are also innovative:

Embodiment 1 is a method, the method comprising: receiving a message; parsing the message to identify individual sentences within the message; encoding each sentence into a vector that represents a semantic meaning of the sentence; applying one or more classification models to the message including: providing each vector to a machine learning model, wherein the machine learning model is trained to generate a prediction of one or more classifications for each sentence of the message; generating a predicted classification for the message as a whole; and determining a message routing based on the predicted classification.

Embodiment 2 is the method of embodiment 1, wherein generating a predicted classification for the message as a whole comprises: determining whether at least one sentence has a first predicted classification; and responsive to determining that at least one sentence has the first predicted classification, assigning the message with the first classification.

Embodiment 3 is the method of any one of embodiments 1 through 2, wherein applying one or more classification models comprises: applying a rule-based classifier to the message; and overriding a classification of the machine learning model in response to a conflicting classification by the rule-based classifier.

Embodiment 4 is the method of any one of embodiments 1 through 3, wherein applying the rule-based classifier to the message comprises: determining whether the message includes an attachment of a specified file type; and responsive to determining that the message includes the attachment of the specified file type, assigning a first classification to the message.

Embodiment 5 is the method of any one of embodiments 1 through 4, wherein applying the rule-based classifier to the message comprises: applying a domain knowledge base to the message content; and in response to determining that the message includes one or more terms from the knowledge base, assigning a first classification to the message.

Embodiment 6 is the method of any one of embodiments 1 through 5, further comprising: prior to parsing the message, performing one or more preprocessing operations to remove extraneous content from the message.

Embodiment 7 is the method of any one of embodiments 1 through 6, wherein the one or more preprocessing operations comprise removing text associated with other messages in a message chain.

Embodiment 8 is the method of any one of embodiments 1 through 7, wherein determining the message routing comprises: for a first predicted classification of the message, routing the message to one or more human operators or system processes to further process the message; and for a second predicted classification of the message, routing the message to a default storage location.

Embodiment 9 is a system comprising one or more computers and one or more storage devices on which are stored instructions that are operable, when executed by the one or more computers, to cause the one or more computers to perform the method of any one of embodiments 1 to 8.

Embodiment 10 is one or more computer-readable storage media encoded with instructions that, when executed by one or more computers, cause the one or more computers to perform the method of any one of embodiments 1 to 8.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    receiving a message;
    parsing the message to identify individual sentences within the message;
    encoding each sentence into a vector that represents a semantic meaning of the sentence;
    applying one or more classification models to the message including: providing each vector to a machine learning model, wherein the machine learning model is trained to generate a prediction of one or more classifications for each sentence of the message, the classification for each sentence of the message indicating a prediction of whether the sentence is actionable or not, wherein a classification of actionable indicates that the sentence is associated with a process of a real estate transaction and includes content for advancing a workflow of the real estate transaction;
    generating a predicted classification for the message as a whole as being actionable or unactionable based on the classifications of individual sentences of the message; and
    determining a message routing based on the predicted classification.

2. The method of claim 1, wherein generating a predicted classification for the message as a whole comprises:
    determining whether at least one sentence has a first predicted classification; and
    responsive to determining that at least one sentence has the first predicted classification, assigning the message with the first classification.

3. The method of claim 1, wherein applying one or more classification models comprises:
    applying a rule-based classifier to the message; and
    overriding a classification of the machine learning model in response to a conflicting classification by the rule-based classifier.

4. The method of claim 3, wherein applying the rule-based classifier to the message comprises:
    determining whether the message includes an attachment of a specified file type; and
    responsive to determining that the message includes the attachment of the specified file type, assigning a first classification to the message.

5. The method of claim 3, wherein applying the rule-based classifier to the message comprises:
    applying a domain knowledge base to the message content; and
    in response to determining that the message includes one or more terms from the knowledge base, assigning a first classification to the message.

6. The method of claim 1, further comprising:
    prior to parsing the message, performing one or more preprocessing operations to remove extraneous content from the message.

7. The method of claim 6, wherein the one or more preprocessing operations comprise removing text associated with other messages in a message chain.

8. The method of claim 1, wherein determining the message routing comprises:
    for a first predicted classification of the message, routing the message to one or more human operators or system processes to further process the message; and
    for a second predicted classification of the message, routing the message to a default storage location.

9. A system comprising:
    one or more computers and one or more storage devices on which are stored instructions that are operable, when executed by the one or more computers, to cause the one or more computers to perform operations comprising:
    receiving a message;
    parsing the message to identify individual sentences within the message;
    encoding each sentence into a vector that represents a semantic meaning of the sentence;
    applying one or more classification models to the message including: providing each vector to a machine learning model, wherein the machine learning model is trained to generate a prediction of one or more classifications for each sentence of the message, the classification for each sentence of the message indicating a prediction of whether the sentence is actionable or not, wherein a classification of actionable indicates that the sentence is associated with a process of a real estate transaction and includes content for advancing a workflow of the real estate transaction;
    generating a predicted classification for the message as a whole as being actionable or unactionable based on the classifications of individual sentences of the message; and
    determining a message routing based on the predicted classification.

10. The system of claim 9, wherein generating a predicted classification for the message as a whole comprises:
    determining whether at least one sentence has a first predicted classification; and
    responsive to determining that at least one sentence has the first predicted classification, assigning the message with the first classification.

11. The system of claim 9, wherein applying one or more classification models comprises:
    applying a rule-based classifier to the message; and
    overriding a classification of the machine learning model in response to a conflicting classification by the rule-based classifier.

12. The system of claim 11, wherein applying the rule-based classifier to the message comprises:
　determining whether the message includes an attachment of a specified file type; and
　responsive to determining that the message includes the attachment of the specified file type, assigning a first classification to the message.

13. The system of claim 11, wherein applying the rule-based classifier to the message comprises:
　applying a domain knowledge base to the message content; and
　in response to determining that the message includes one or more terms from the knowledge base, assigning a first classification to the message.

14. The system of claim 9, wherein the instructions are further operable to cause the one or more computers to perform operation comprising:
　prior to parsing the message, performing one or more preprocessing operations to remove extraneous content from the message.

15. The system of claim 14, wherein the one or more preprocessing operations comprise removing text associated with other messages in a message chain.

16. The system of claim 9, wherein determining the message routing comprises:
　for a first predicted classification of the message, routing the message to one or more human operators or system processes to further process the message; and
　for a second predicted classification of the message, routing the message to a default storage location.

17. One or more computer-readable storage media encoded with instructions that, when executed by one or more computers, cause the one or more computers to perform operations comprising:
　receiving a message;
　parsing the message to identify individual sentences within the message;
　encoding each sentence into a vector that represents a semantic meaning of the sentence;
　applying one or more classification models to the message including: providing each vector to a machine learning model, wherein the machine learning model is trained to generate a prediction of one or more classifications for each sentence of the message, the classification for each sentence of the message indicating a prediction of whether the sentence is actionable or not, wherein a classification of actionable indicates that the sentence is associated with a process of a Page real estate transaction and includes content for advancing a workflow of the real estate transaction;
　generating a predicted classification for the message as a whole as being actionable or unactionable based on the classifications of individual sentences of the message; and
　determining a message routing based on the predicted classification.

18. The computer-readable storage media of claim 17, wherein generating a predicted classification for the message as a whole comprises:
　determining whether at least one sentence has a first predicted classification; and
　responsive to determining that at least one sentence has the first predicted classification, assigning the message with the first classification.

19. The computer-readable storage media of claim 17, wherein applying one or more classification models comprises:
　applying a rule-based classifier to the message; and
　overriding a classification of the machine learning model in response to a conflicting classification by the rule-based classifier.

20. The computer-readable storage media of claim 19, wherein applying the rule-based classifier to the message comprises:
　determining whether the message includes an attachment of a specified file type; and
　responsive to determining that the message includes the attachment of the specified file type, assigning a first classification to the message.

21. The computer-readable storage media of claim 19, wherein applying the rule-based classifier to the message comprises:
　applying a domain knowledge base to the message content; and
　in response to determining that the message includes one or more terms from the knowledge base, assigning a first classification to the message.

22. The computer-readable storage media of claim 17, wherein the instructions further cause the one or more computers to perform operations comprising:
　prior to parsing the message, performing one or more preprocessing operations to remove extraneous content from the message.

23. The computer-readable storage media of claim 22, wherein the one or more preprocessing operations comprise removing text associated with other messages in a message chain.

24. The computer-readable storage media of claim 17, wherein determining the message routing comprises:
　for a first predicted classification of the message, routing the message to one or more human operators or system processes to further process the message; and
　for a second predicted classification of the message, routing the message to a default storage location.

25. A method comprising:
　receiving a message;
　parsing the message to identify individual sentences within the message;
　encoding each sentence into a vector that represents a semantic meaning of the sentence;
　applying a machine learning model to the message including: providing each vector to the machine learning model, wherein the machine learning model is trained to generate a prediction of one or more classifications for each sentence of the message, the classification for each sentence of the message indicating a prediction of whether the sentence is actionable or not, wherein a classification of actionable indicates that the sentence is associated with a process of a real estate transaction and includes content for advancing a workflow of the real estate transaction;
　generating a predicted first classification for the message as a whole as being actionable or unactionable based on the machine learning model classifications of individual sentences of the message;
　applying a rule based classifier to the message including applying one or more rules to the message that define a message as actionable or not;
　generating a second classification for the message as a whole as being actionable or unactionable based on whether one or more of the rules are satisfied;

determining a message classification based on the first classification for the message and the second classification for the message; and determining a message routing based on the determined message classification.

\* \* \* \* \*